United States Patent
Park et al.

(10) Patent No.: US 8,094,735 B2
(45) Date of Patent: Jan. 10, 2012

(54) METHODS AND APPARATUS FOR MAXIMUM RATIO COMBINING FOR DUPLICATED SIGNALS IN OFDMA SYSTEMS

(75) Inventors: Jong Hyeon Park, San Jose, CA (US); Tae Ryun Chang, Santa Clara, CA (US); Je Woo Kim, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 904 days.

(21) Appl. No.: 11/969,349

(22) Filed: Jan. 4, 2008

(65) Prior Publication Data
US 2009/0175364 A1 Jul. 9, 2009

(51) Int. Cl.
*H04K 1/10* (2006.01)
*H04L 27/28* (2006.01)

(52) U.S. Cl. ......... 375/260; 375/229; 375/232; 375/316

(58) Field of Classification Search .................. 375/260, 375/316, 229, 232
See application file for complete search history.

(56) References Cited

U.S. PATENT DOCUMENTS

| | | | |
|---|---|---|---|
| 7,236,452 B2 * | 6/2007 | Maeda et al. | 370/210 |
| 7,428,280 B2 * | 9/2008 | Aoki et al. | 375/349 |
| 2006/0083336 A1 | 4/2006 | Zhang et al. | |
| 2009/0239494 A1 * | 9/2009 | Park et al. | 455/278.1 |

FOREIGN PATENT DOCUMENTS

| | | |
|---|---|---|
| GB | 2434065 A | 7/2007 |
| WO | WO2007032642 | 3/2007 |
| WO | WO2007075074 A1 | 7/2007 |

OTHER PUBLICATIONS

International Search Report and Written Opinion—PCT/US2008/067164, International Search Authority—European Patent Office—Nov. 11, 2008.

* cited by examiner

*Primary Examiner* — Ted Wang
(74) *Attorney, Agent, or Firm* — Milan Patel

(57) ABSTRACT

In accordance with a method for processing a received orthogonal frequency division multiple access (OFDMA) signal that comprises a duplicated signal, sub-carriers within the OFDMA signal may be arranged into a duplicated format. The OFDMA signal may be equalized and combined after the sub-carriers have been arranged into the duplicated format. The equalizing and combining may be performed in accordance with a maximum ratio combining (MRC) scheme. The OFDMA signal may be demapped after the equalizing and combining is performed.

48 Claims, 13 Drawing Sheets

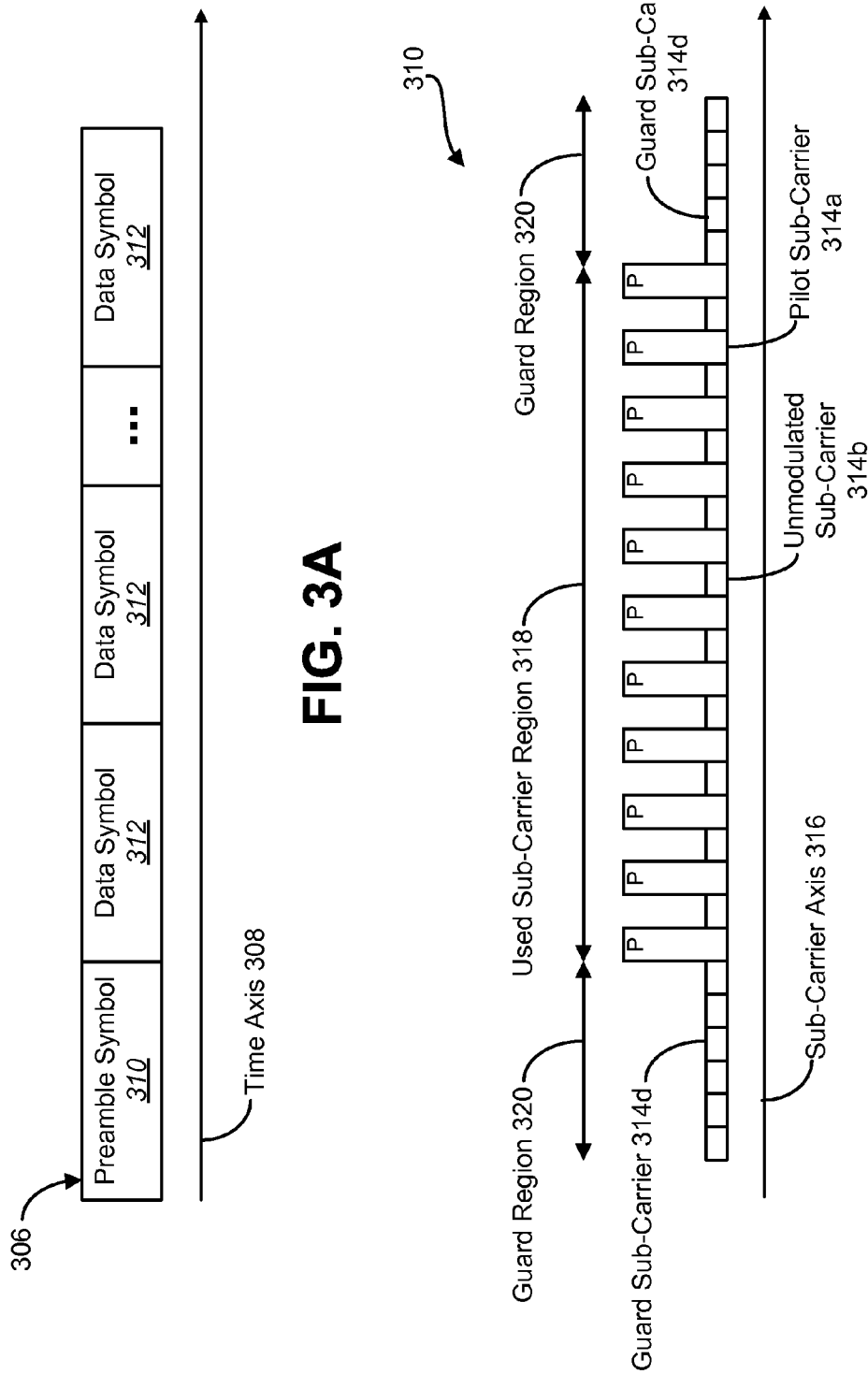

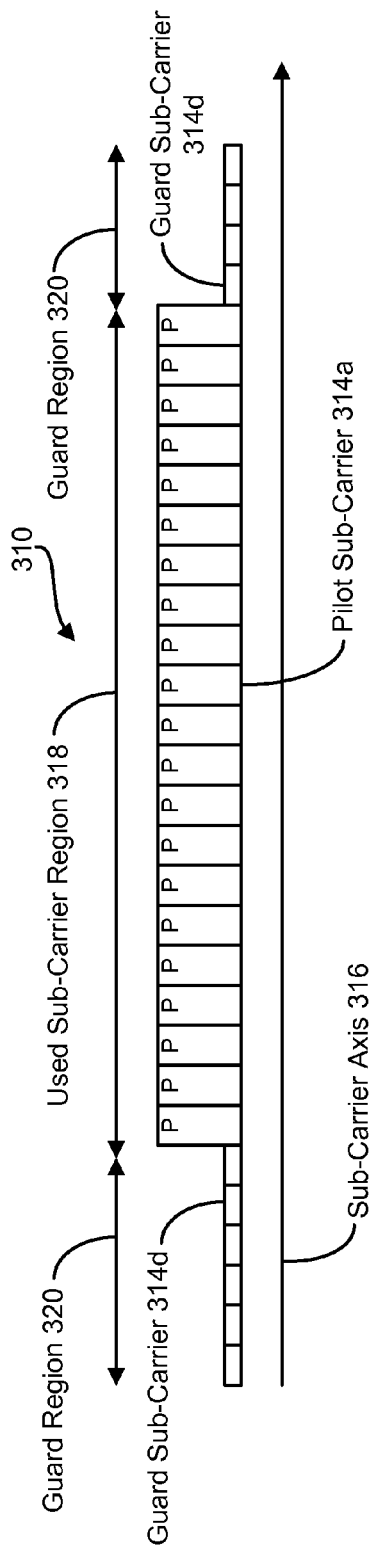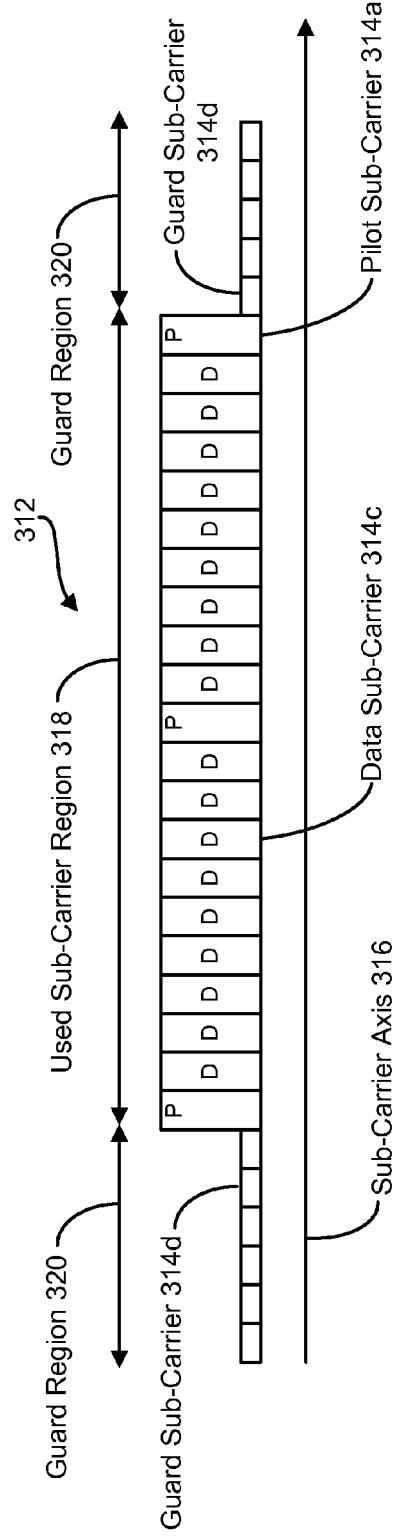

US 8,094,735 B2

METHODS AND APPARATUS FOR MAXIMUM RATIO COMBINING FOR DUPLICATED SIGNALS IN OFDMA SYSTEMS

TECHNICAL FIELD

The present disclosure relates generally to wireless communication systems. More specifically, the present disclosure relates to methods and apparatus for maximum ratio combining for duplicated signals in orthogonal frequency division multiple access (OFDMA) systems.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

As indicated above, the present disclosure relates generally to wireless communication systems. More specifically, the present disclosure relates to methods and apparatus for maximum ratio combining for duplicated signals in orthogonal frequency division multiple access (OFDMA) systems.

BRIEF DESCRIPTION OF THE DRAWINGS

FIG. 3A illustrates an example of a frame that may be transmitted from a base station to a user terminal on a downlink within an OFDMA system;

FIGS. 3B and 3C illustrate examples of frequency domain representations of a preamble symbol;

FIG. 3D illustrates an example of a frequency domain representation of a data symbol;

SUMMARY

A method for processing a received orthogonal frequency division multiple access (OFDMA) signal that comprises a duplicated signal is disclosed. The method may include arranging sub-carriers within the OFDMA signal into a duplicated format. The method may also include equalizing and combining the OFDMA signal after the sub-carriers have been arranged into the duplicated format. Equalizing and combining may be performed in accordance with a maximum ratio combining (MRC) scheme. The method may also include demapping the OFDMA signal. Demapping may be performed after the equalizing and combining is performed.

A wireless device for processing a received orthogonal frequency division multiple access (OFDMA) signal that comprises a duplicated signal is also disclosed. The wireless device may include a first look-ahead sub-carrier arranger that is configured to arrange sub-carriers within the OFDMA signal into a duplicated format. The wireless device may also include an equalizer and combiner that is configured to equalize and combine the OFDMA signal after the sub-carriers have been arranged into the duplicated format. Equalizing and combining may be performed in accordance with a maximum ratio combining (MRC) scheme. The wireless device may also include a demapper that is configured to demap the OFDMA signal. Demapping may be performed after the equalizing and combining is performed.

An apparatus for processing a received orthogonal frequency division multiple access (OFDMA) signal that comprises a duplicated signal is also disclosed. The apparatus may include means for arranging sub-carriers within the OFDMA signal into a duplicated format. The apparatus may also include means for equalizing and combining the OFDMA signal after the sub-carriers have been arranged into the duplicated format. Equalizing and combining may be performed in accordance with a maximum ratio combining (MRC) scheme. The apparatus may also include means for demapping the OFDMA signal. Demapping may be performed after the equalizing and combining is performed.

A computer-program product for processing a received orthogonal frequency division multiple access (OFDMA) signal that comprises a duplicated signal is also disclosed. The computer-program product may include a computer readable medium having instructions thereon. The instructions may include code for arranging sub-carriers within the OFDMA signal into a duplicated format. The instructions may also include code for equalizing and combining the OFDMA signal after the sub-carriers have been arranged into the duplicated format. Equalizing and combining may be performed in accordance with a maximum ratio combining (MRC) scheme. The instructions may also include code for demapping the OFDMA signal. Demapping may be performed after the equalizing and combining is performed.

DETAILED DESCRIPTION

Figure 1:
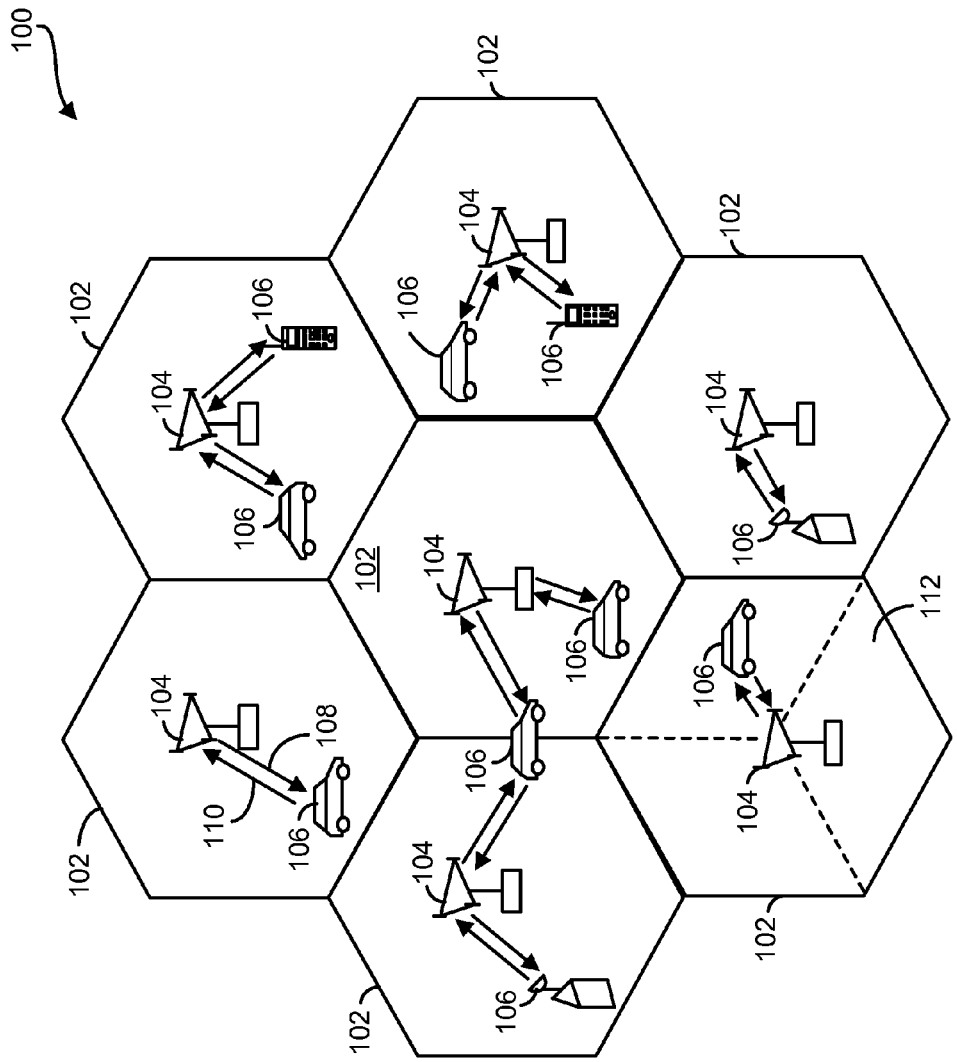
FIG. 1 illustrates an example of a wireless communication system.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within the wireless communication system 100 may utilize antennas that concentrate the flow of power within a particular sector 112 of the cell 102. Such antennas may be referred to as directional antennas.

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique based on OFDM. With OFDMA, users may be assigned sub-carriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDMA systems are today regarded as one of the most promising research areas and as a key technology for the next generation of wireless communications. This is due to the fact that OFDMA modulation schemes can provide many advantages like modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 Oct. 2005" in October 2005 for mobile BWA systems. Those two standards defined four different physical layers (PHYs) and one medium access control (MAC) layer. The OFDMA physical layer of the four physical layers are the most popular in the fixed and mobile BWA areas respectively.

Figure 2:
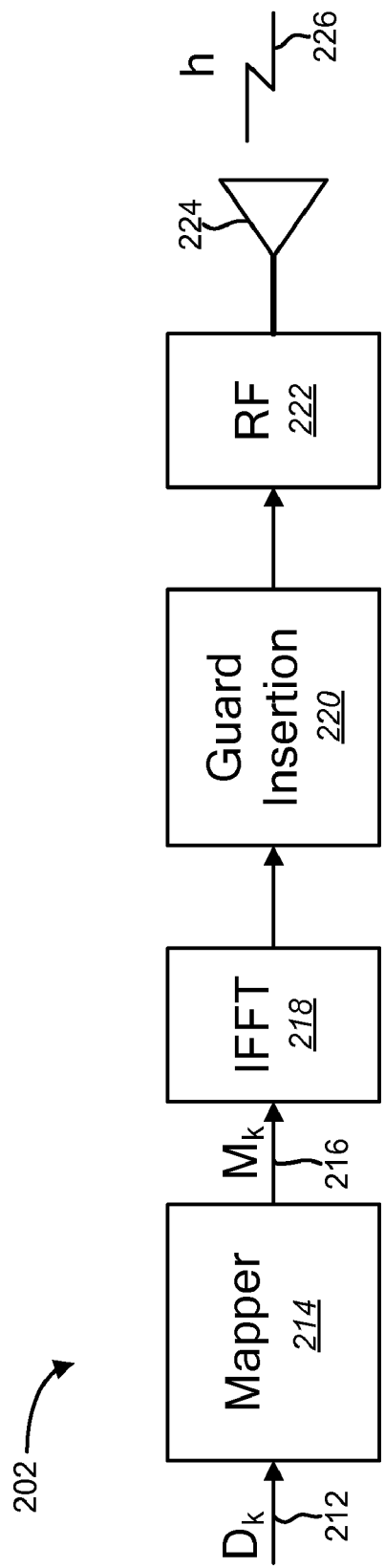
FIG. 2 illustrates an example of a transmitter for an OFDMA system.

FIG. 2 illustrates an example of a transmitter 202 for an OFDMA system. Transmission data $D_k$ 212 is shown being fed into a mapper 214. The mapper 214 may perform mapping and modulation, and may output a mapped/modulated signal $M_k$ 216. The mapped/modulated signal $M_k$ 216 is shown being processed by an inverse fast Fourier transform (IFFT) component 218, a guard insertion component 220, a radio frequency (RF) front end 222, and an antenna 224. The resulting signal 226 is then shown being transmitted into a wireless channel h.

FIG. 3A illustrates an example of a frame 306 that may be transmitted from a base station 104 to a user terminal 106 on a downlink 108 within an OFDMA system. The OFDMA frame 306 is shown with respect to a time axis 308. The OFDMA frame 306 is shown with one preamble symbol 310 and multiple data symbols 312. Although just one preamble symbol 310 is shown in FIG. 3A, an OFDMA frame 306 may include multiple preamble symbols 310.

FIGS. 3B and 3C illustrate examples of frequency domain representations of a preamble symbol 310. These frequency domain representations are shown with respect to a sub-carrier axis 316. A used sub-carrier region 318 is shown. Two guard regions 320 are also shown.

In FIG. 3B, the used sub-carrier region 318 includes pilot sub-carriers 314a alternated with unmodulated sub-carriers 314b. In FIG. 3C, each sub-carrier 314 in the used sub-carrier region 318 is a pilot sub-carrier 314a.

FIG. 3D illustrates an example of a frequency domain representation of a data symbol 312. The data symbol 312 includes both data sub-carriers 314c and pilot sub-carriers 314a. A receiver may perform channel estimation using pilot sub-carriers 314a of a preamble symbol 310 and/or pilot sub-carriers 314a of a data symbol 312.

The number of sub-carriers 314 within an OFDMA system may be equal to the number of fast Fourier transform (FFT) points. All available sub-carriers 314 may not be used. In particular, guard sub-carriers 314d in guard regions 320 may be excluded. In FIGS. 3B through 3D, guard sub-carriers 314d are shown around the lower and higher frequency bands. These guard sub-carriers 314d may not be allocated for data sub-carriers 314c or pilot sub-carriers 314a.

Figure 4:
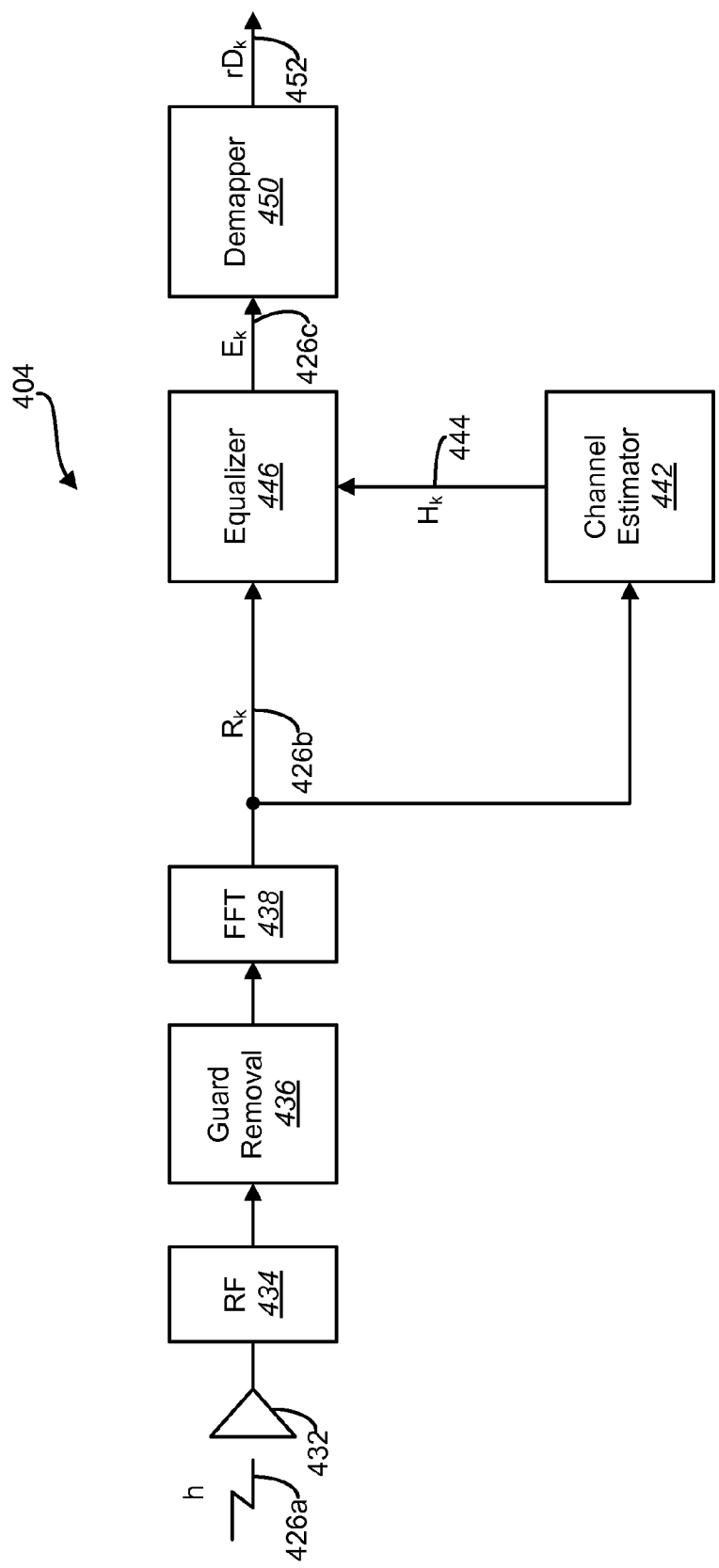
FIG. 4 illustrates a single receiver architecture of typical OFDMA systems.

FIG. 4 illustrates a single receiver architecture 404 of typical OFDMA systems. An antenna 432 receives an OFDMA signal 426a from a wireless channel h. The received OFDMA signal 426a is processed by an RF front end 434, a guard removal component 436, and a fast Fourier transform (FFT) component 438. This results in a frequency domain OFDMA signal 426b, which is shown as $R_k$ 426b in FIG. 4.

Next, channel estimation may be performed. The frequency domain OFDMA signal $R_k$ 426b is shown being provided as input to a channel estimator 442. Channel estimation may be realized using pilot tones and an interpolation process. The result of the channel estimation is a channel estimate 444, which is shown as $H_k$ 444.

An equalizer 446 is shown. The frequency domain OFDMA signal $R_k$ 426b may be equalized using the channel estimate $H_k$ 444 in accordance with equation (1):

$$E_k = \begin{cases} \frac{R_k}{H_k}, & \text{if } k \text{ is used subcarrier} \\ 0, & \text{else} \end{cases}, k = 1, \ldots, N \quad (1)$$

The output of the equalizer 446 is an equalized signal 426c, which is shown as $E_k$ 426c. The equalized signal $E_k$ 426c may be demapped and demodulated by a demapper 450, resulting in data $rD_k$ 452.

An OFDMA system may have a duplicated transmission function. For example, the IEEE802.16e standards support duplicated transmission for the frame control header (FCH) channel. The contents of the FCH channel are called the downlink frame prefix (DLFP). The DLFP is a data structure that is transmitted at the beginning of each frame. The DLFP contains information regarding the current frame and is mapped to the FCH.

Figure 5:
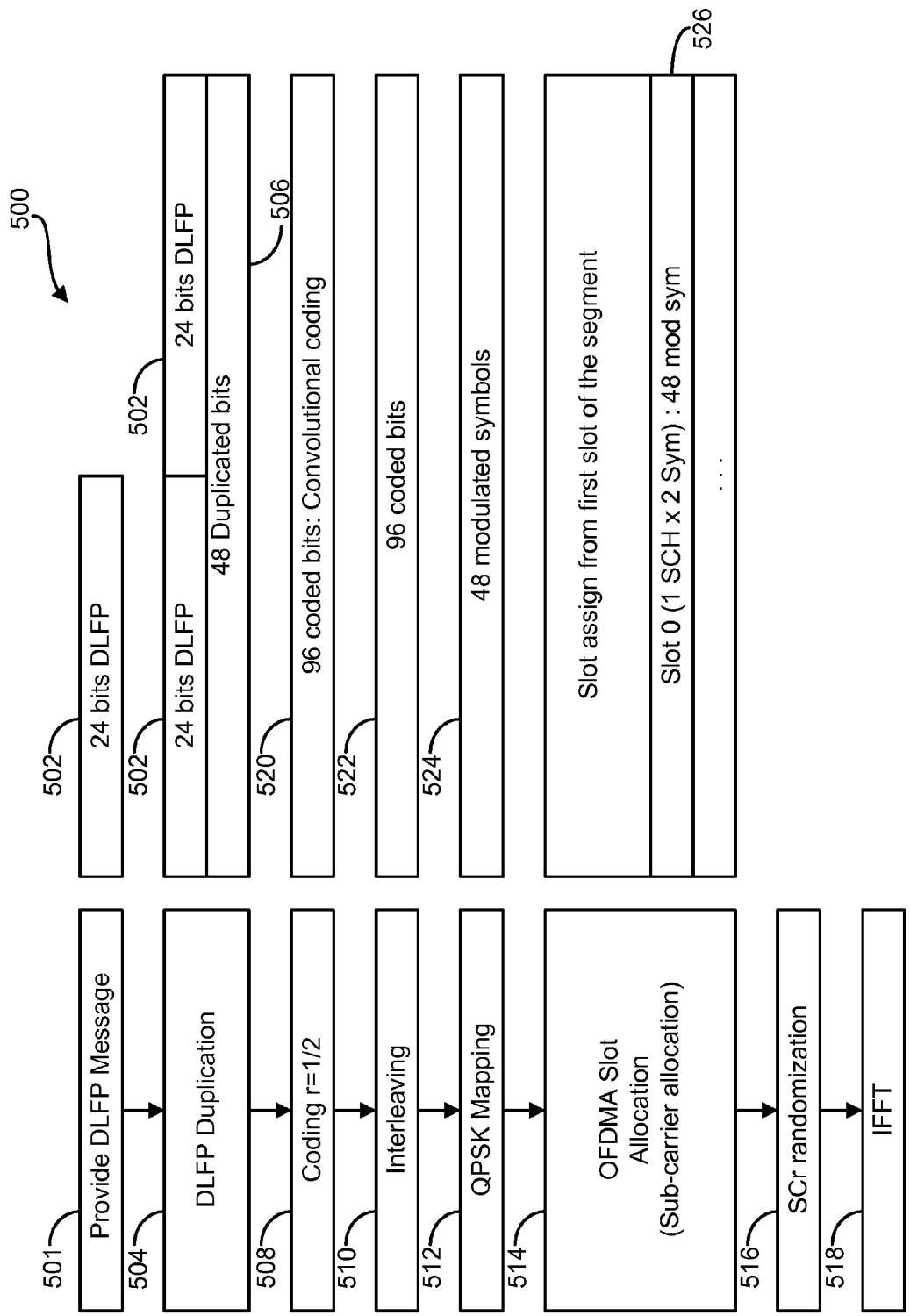
FIG. 5 illustrates an example of a method of transmission of a downlink frame prefix message on a frame control header channel.

FIG. 5 illustrates an example of a method 500 of FCH/DLFP transmission. A 24-bit DLFP message 502 may be provided 501 and then duplicated 504 to form a 48-bit block 506. The following operations may then be performed with respect to the 48-bit block 506: convolutional coding 508, interleaving 510, QPSK mapping 512, OFDMA slot allocation (sub-carrier allocation) 514, sub-carrier randomization 516, and an $N_{fft}$-point inverse fast Fourier transform (IFFT) operation 518.

The result of the convolutional coding 508 may be a block 520 of 96 coded bits. The result of the interleaving 510 may also be a block 522 of 96 coded bits. The result of the QPSK mapping 512 may be a block 524 of 48 modulated symbols. OFDMA slot allocation (sub-carrier allocation) 514 may involve assigning slots from the first slot 526 corresponding to the segment.

Figure 6A:
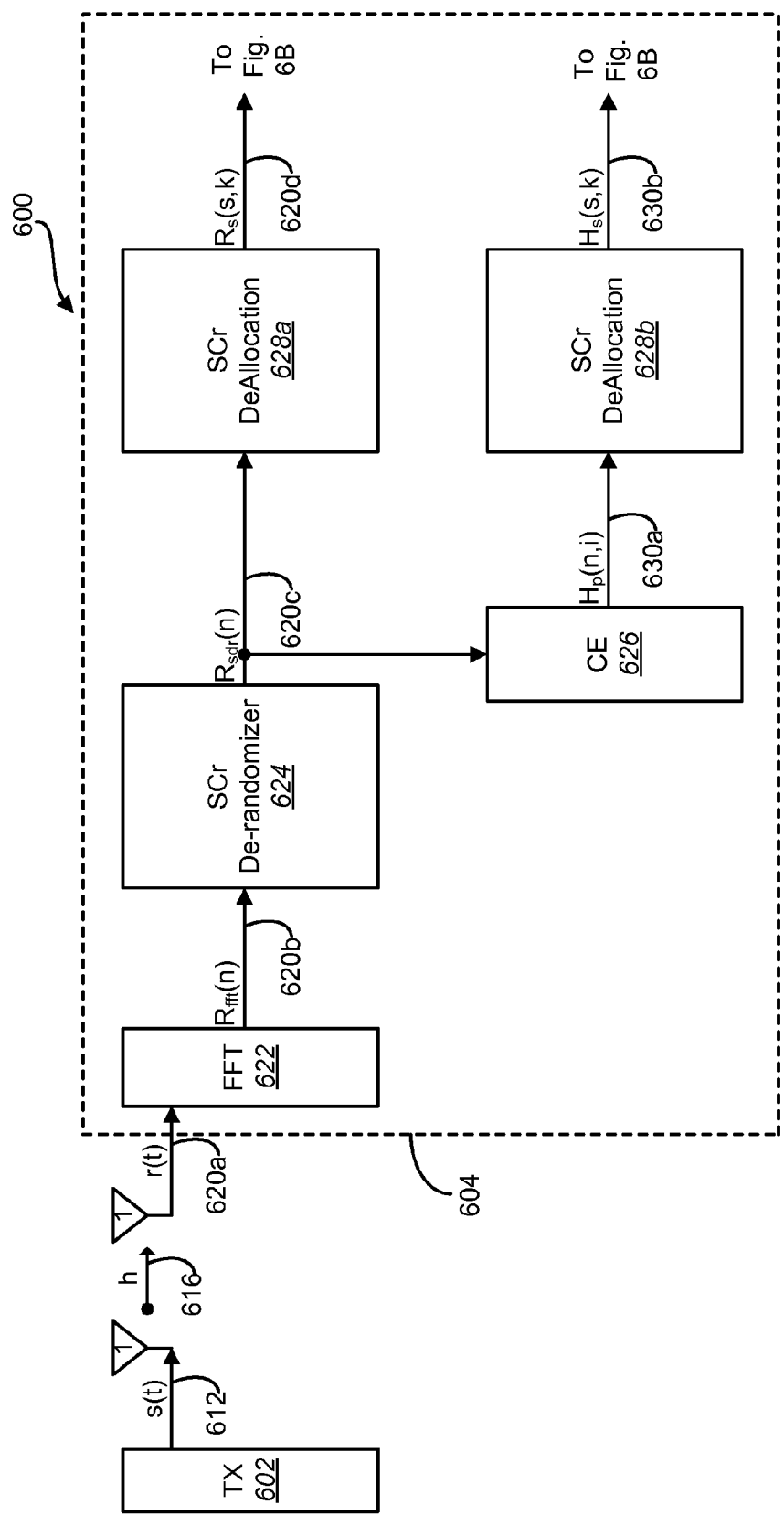
FIGS. 6A and 6B illustrate an example of a system for decoding an OFDMA signal that includes a duplicated signal.
Figure 6B:
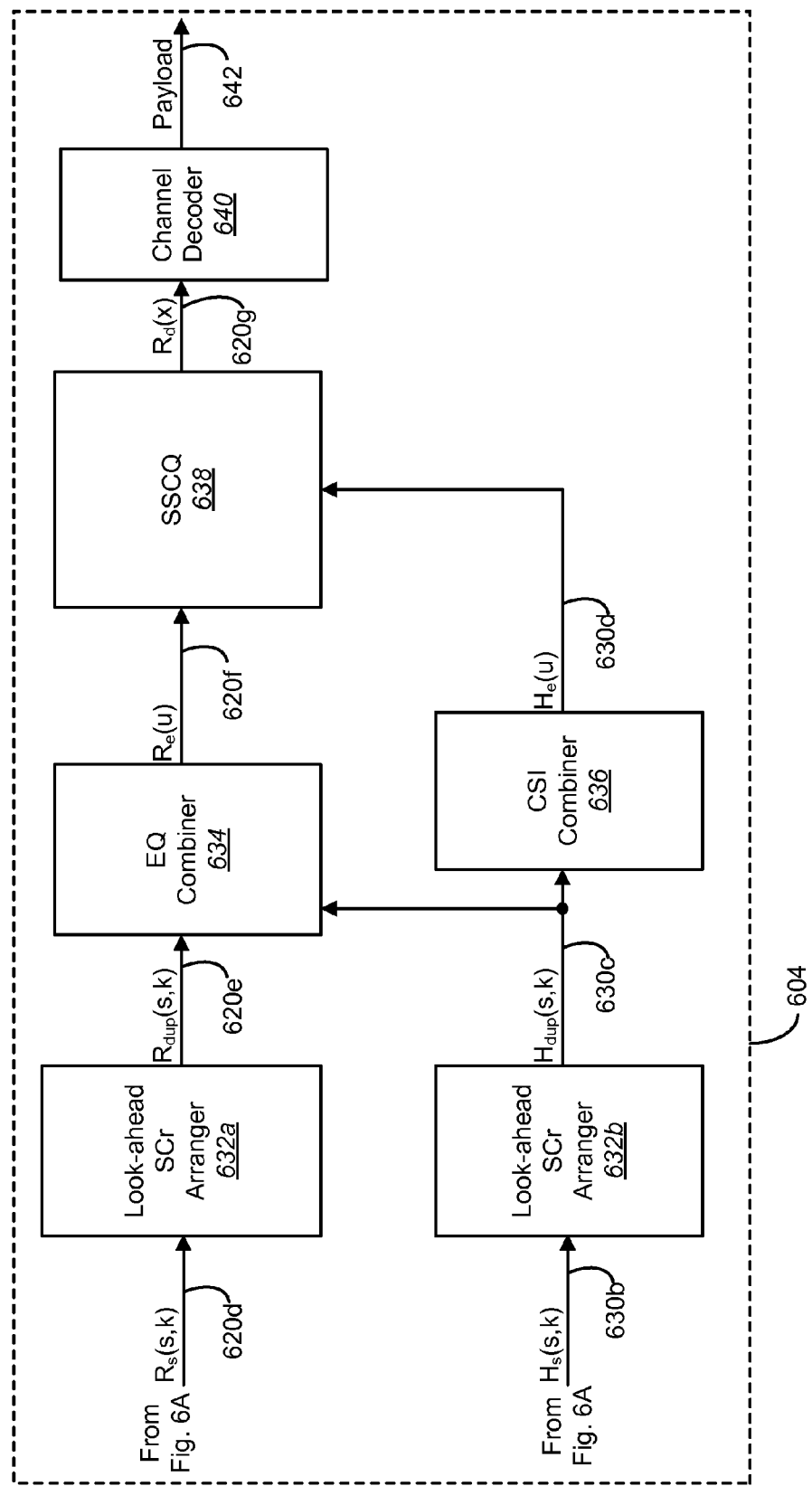

FIGS. 6A and 6B illustrate an example of a system 600 for decoding an OFDMA signal that includes a duplicated signal, such as a duplicated DLFP message. A transmitter 602 is shown transmitting an OFDMA signal s(t) 612 over a channel h(t) 616.

A receiver 604 is shown receiving an OFDMA signal r(t) 620a. The received OFDMA signal r(t) 620a may be expressed as in equation (2), where the term n(t) indicates noise:

$$r(t) = s(t) \otimes h(t) + n(t) \quad (2)$$

An FFT component 622 is shown. The FFT component 622 may be configured to perform an $N_{fft}$-point FFT operation on the received OFDMA signal r(t) 620a. The result of the $N_{fft}$-point FFT operation is a frequency domain OFDMA signal 620b. The frequency domain OFDMA signal 620b may be as defined in equation (3):

$$R_{fft}(n) = fft(r(t)), n = 1, 2, \ldots, N_{fft}, t = 1, 2, \ldots, N_{fft} \quad (3)$$

Sub-carrier de-randomization may be performed with respect to the frequency domain OFDMA signal $R_{fft}(n)$ 620b for all useful sub-carriers (i.e., those in the used sub-carrier region 318). The frequency domain OFDMA signal $R_{fft}(n)$ 620b is shown being provided to a sub-carrier de-randomizer 624. The output of the sub-carrier de-randomizer 624 is a de-randomized OFDMA signal 620c, which is shown as $R_{sdr}(n)$ 620c.

Next, channel estimation may be performed. The de-randomized signal $R_{sdr}(n)$ 620c is shown being provided as input to a channel estimation component 626. The resulting channel estimate 630a is shown as $H_p(n,i)$ 630a, where n is as indicated above, and i= . . . , sym(i−1), sym(i), sym(i+1), . . . .

Sub-carrier de-allocation may then be performed. The de-randomized OFDMA signal $R_{sdr}(n)$ 620c is shown being provided as input to a first sub-carrier de-allocation component 628a, and the output of the first sub-carrier de-allocation component 628a is a de-allocated OFDMA signal $R_s(s,k)$ 620d. The channel estimate $H_p(n,i)$ 630a is shown being provided as input to a second sub-carrier de-allocation component 628b, and the output of the second sub-carrier de-allocation component 628b is a de-allocated channel estimate $H_s(s,k)$ 630b.

The term s is an allocated slot index, and s=1, 2, . . . , $N_s$. The term $N_s$ refers to the number of allocated slots for the coding block. The term k is a sub-carrier index, and k=1, 2, . . . , $N_{sc}$. The term $N_{sc}$ refers to the number of sub-carriers for a slot.

The sub-carrier de-allocation may be performed using the same permutation scheme that was used in the transmitter 602 for purposes of sub-carrier allocation. Sub-carrier de-allocation may involve extracting the corresponding sub-carriers and arranging the sub-carriers into the slot basis format.

As will be explained below, the receiver 604 may be configured to perform equalization and combining based on a maximum ratio combining (MRC) scheme. However, certain issues may arise when applying an MRC combining scheme for an OFDMA signal that includes a duplicated signal. For example, the duplication may have been done before channel encoding at the transmitter 602. (For an example, please refer to the method 500 of FCH/DLFP transmission that is shown in FIG. 5 and that was discussed above.) Typically, the steps that are performed by a transmitter 602 are performed in reverse order by a receiver 604. Thus, it may be preferable for any processing that is related to the duplicated signal to be done after channel decoding (and therefore after de-mapping) at the receiver 604. In other words, this may be considered to be the natural processing order, considering the procedure at the transmitter 602. However, it may be that the best position for MRC combining of the duplicated signal is before de-mapping.

To address this issue, a look-ahead sub-carrier arranging scheme may be utilized. The look-ahead sub-carrier arranging scheme may achieve the result of arranging the sub-carriers within the de-allocated OFDMA signal $R_s(s,k)$ 620d and the de-allocated channel estimate $H_s(s,k)$ 630b into a duplicated format. The look-ahead sub-carrier arranging scheme may be realized by performing look-ahead processing. The look-ahead processing may include investigating/reverse-tracing the transmission process, i.e., the process that was followed at the transmitter 602 (e.g., duplication→channel coding→interleaving→mapping). The look-ahead processing may also include performing de-interleaving prior to equalizing and combining (and therefore prior to de-mapping).

The de-allocated OFDMA signal $R_s(s,k)$ 620d is shown being provided to a first look-ahead sub-carrier arranger 632a. The output of the first look-ahead sub-carrier arranger 632a is a duplicated format OFDMA signal $R_{dup}(s,k)$ 620e. The de-allocated channel estimate $H_s(s,k)$ 630b is provided to a second look-ahead sub-carrier arranger 632b. The output of the second look-ahead sub-carrier arranger 632b is a duplicated format channel estimate $H_{dup}(s,k)$ 630c.

An equalizer and combiner 634 may be configured to equalize and combine the duplicated format OFDMA signal $R_{dup}(s,k)$ 620e based on an MRC scheme. All corresponding slots and duplicated signals (sub-carriers) may be combined using the MRC scheme. The output of the equalizer and combiner 634 is shown as an equalized OFDMA signal $R_e(u)$ 620f.

Equalization and combining may be performed in accordance with equation (4):

$$R_e(u) = \frac{R_{dup}(s,u)H_{dup}(s,u)^* + R_{dup}(s,N_u+u)H_{dup}(s,N_u+u)^*}{|H_{dup}(s,u)|^2 + |H_{dup}(s,N_u+u)|^2} \quad (4)$$

In equation (4), the term s is as indicated above. The term $u=1, 2, \ldots, N_u$, where $$N_u = \frac{N_{sc}}{2},$$

and where $N_{sc}$ is as indicated above. The term ( )* refers to the complex conjugate of ( ).

A channel status information (CSI) combiner 636 may be configured to perform CSI combining with respect to the duplicated format channel estimate $H_{dup}(s,k)$ 630c. The CSI combining may also be based on an MRC scheme. The output of the CSI combiner 636 is shown as a CSI estimate $H_e(u)$ 630d.

CSI combining may be performed in accordance with equation (5):

$$H_e(u) = \frac{|H_{dup}(s,u)|^2 + |H_{dup}(s,N_u+u)|^2}{2} \quad (5)$$

An SSCQ component 638 is shown, where the acronym SSCQ stands for soft decision (demapping), scaling, CSI weighting and quantization. Both the equalized OFDMA signal $R_e(u)$ 620f and the CSI estimate $H_e(u)$ 630d are shown being provided as input to the SSCQ component 638. The output of the SSCQ component 638 is a demapped OFDMA signal $R_d(x)$ 620g. The term $x=1, 2, \ldots, N_x$. The term $N_x$ indicates the number of coded soft bits for the coding block, and $N_x=N_u \times N_{mod}$. The term $N_{mod}$ refers to the modulation order. For example, $N_{mod}=2$ if QPSK modulation is used.

A channel decoder 640 may be configured to perform channel decoding with respect to the demapped signal $R_d(x)$ 620g. The result of the channel decoding is the payload 642.

As used herein, the term "OFDMA signal" 620 may refer generally to any data-bearing signal that is processed in accordance with OFDMA techniques. The frequency domain OFDMA signal $R_{fft}(n)$ 620b, the de-randomized OFDMA signal $R_{sdr}(n)$ 620c, the de-allocated OFDMA signal $R_s(s,k)$ 620d, the duplicated format OFDMA signal $R_{dup}(s,k)$ 620e, the equalized OFDMA signal $R_e(u)$ 620f, and the de-mapped OFDMA signal $R_d(x)$ 620g each represent an OFDMA signal 620 at different stages of processing by the receiver 604.

As used herein, the term "channel status information signal" 630 may refer generally to any signal that is related to providing an estimate of channel status information. The channel estimate $H_p(n,i)$ 630a, the de-allocated channel estimate $H_s(s,k)$ 630b, the duplicated format channel estimate $H_{dup}(s,k)$ 630c, and the channel status information estimate $H_e(u)$ 630d each represent a CSI estimation signal 630 at different stages of processing by the receiver 604.

Figure 7:
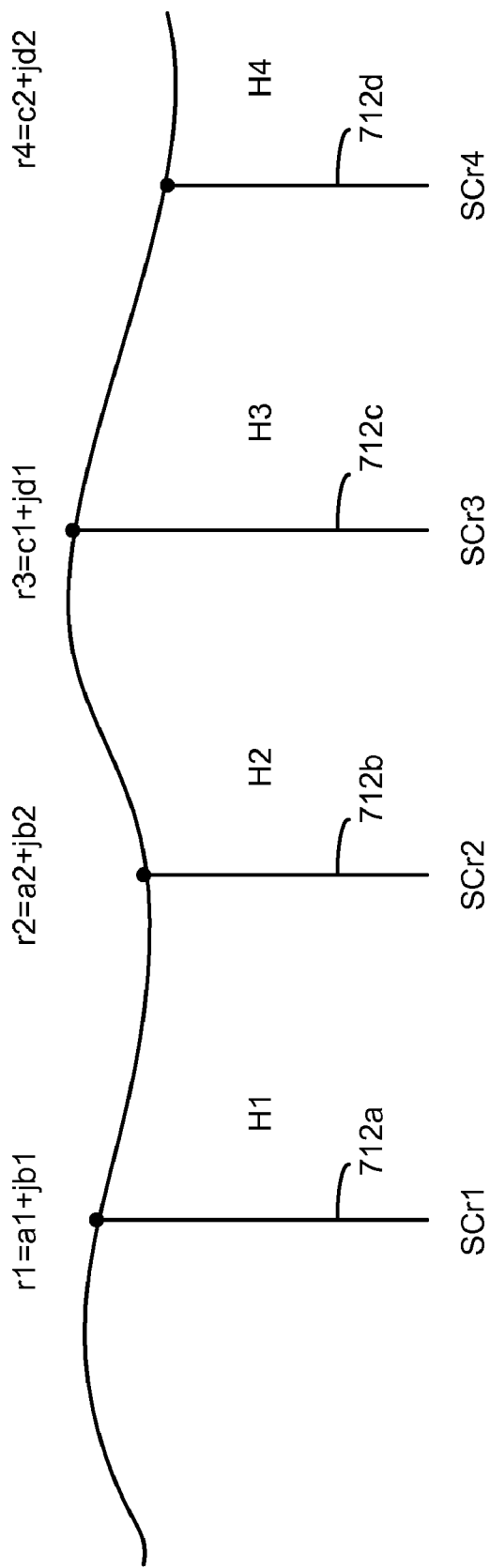
FIG. 7 illustrates one way that duplication pairs may be distributed across different sub-carriers.

FIG. 7 illustrates one way that duplication pairs (i.e., data that is duplicated within an OFDMA signal 620) may be distributed across different sub-carriers 712. The pairs of a1 and a2, b1 and b2, c1 and c2, and d1 and d2 are duplicated respectively. The pair of a1 and a2 comprise the real parts of a first sub-carrier 712a and a second sub-carrier 712b respectively. The pair of b1 and b2 comprise the imaginary parts of the first sub-carrier 712a and the second sub-carrier 712b respectively. The pair of c1 and c2 comprise the real parts of a third sub-carrier 712c and a fourth sub-carrier 712d respectively. The pair of d1 and d2 comprise the imaginary parts of the third sub-carrier 712c and the fourth sub-carrier 712d respectively. Where duplication pairs are distributed across different sub-carriers 712 as shown in FIG. 7, MRC-based equalizing and combining and CSI combining may be performed in accordance with equations (4) and (5) respectively.

Figure 8:
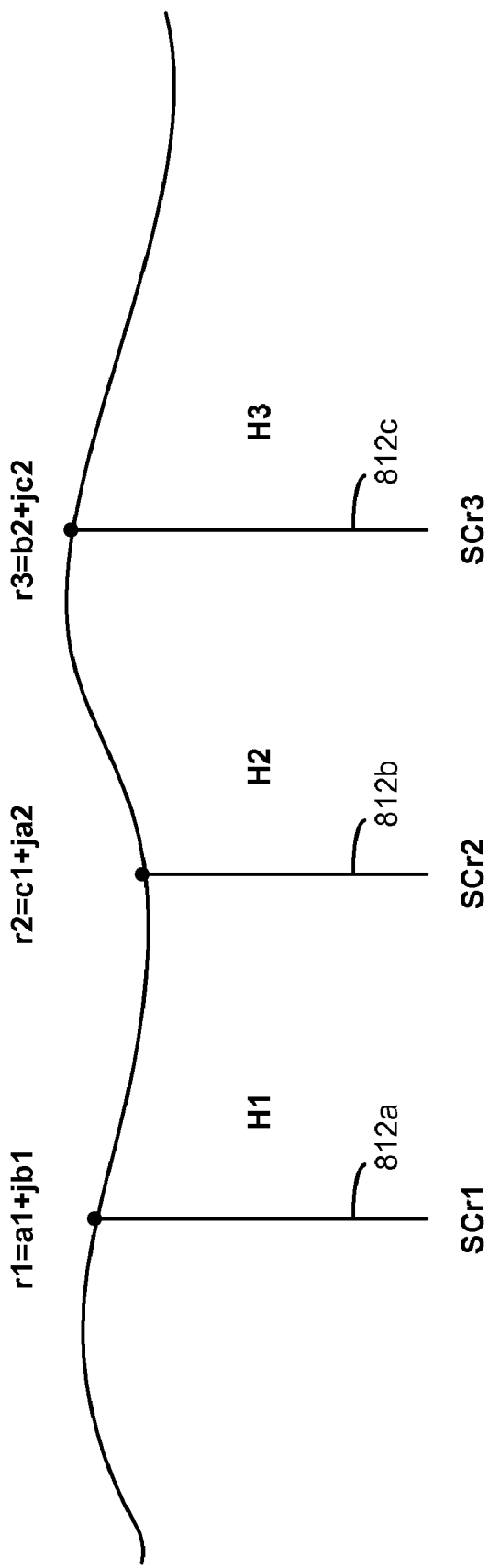
FIG. 8 illustrates another way that duplication pairs may be distributed across different sub-carriers.

FIG. 8 illustrates another way that duplication pairs may be distributed across different sub-carriers 812. The pairs of a1 and a2, b1 and b2, and c1 and c2 are duplicated respectively. The pair of a1 and a2 comprise the real part of a first sub-carrier 812a and the imaginary part of a second sub-carrier 812b respectively. The pair of b1 and b2 comprise the imaginary part of the first sub-carrier 812a and the real part of a third sub-carrier 812c respectively. The pair of c1 and c2 comprise the real part of the second sub-carrier 812b and the imaginary part of the third sub-carrier 812c respectively.

Where a received OFDMA signal 620 includes distributed duplication pairs as shown in FIG. 8, MRC-based equalizing and combining may be performed in accordance with equations (6) through (8):

$$\hat{a} = \frac{\text{Re}\{r1 \times H1^*\} + \text{Im}\{r2 \times H2^*\}}{|H1|^2 + |H2|^2} \quad (6)$$

$$\hat{b} = \frac{\text{Im}\{r1 \times H1^*\} + \text{Re}\{r3 \times H3^*\}}{|H1|^2 + |H3|^2} \quad (7)$$

$$\hat{c} = \frac{\text{Re}\{r2 \times H2^*\} + \text{Im}\{r3 \times H3^*\}}{|H2|^2 + |H3|^2} \quad (8)$$

CSI combining may be performed in accordance with equations (9) through (11):

$$CSI(a) = \frac{|H1|^2 + |H2|^2}{2} \quad (9)$$

$$CSI(b) = \frac{|H1|^2 + |H3|^2}{2} \quad (10)$$

$$CSI(c) = \frac{|H2|^2 + |H3|^2}{2} \quad (11)$$

Given $R_{dup}(s,u)=a_1+jb_1$ and $R_{dup}(s,N_u+u)=c_1+ja_2$, then equalization and combining for the $a_1$ and $a_2$ duplication pair may be performed in accordance with equation (12):

$$R_e(u) = \frac{\text{Re}\{X\} + \text{Im}\{Y\}}{|H_{dup}(s, u)|^2 + |H_{dup}(s, N_u + u)|^2} \quad (12)$$

Given $R_{dup}(s,u)=a_1+jb_1$ and $R_{dup}(s,N_u+u)=b_2+jc_2$, then equalization and combining for the $b_1$ and $b_2$ duplication pair may be performed in accordance with equation (13):

$$R_e(u) = \frac{\text{Im}\{X\} + \text{Re}\{Y\}}{|H_{dup}(s, u)|^2 + |H_{dup}(s, N_u + u)|^2} \quad (13)$$

Given $R_{dup}(s,u)=c_1+ja_2$ and $R_{dup}(s,N_u+u)=b_2+jc_2$, then equalization and combining for the $c_1$ and $c_2$ duplication pair may be performed in accordance with equation (14):

$$R_e(u) = \frac{\text{Re}\{X\} + \text{Im}\{Y\}}{|H_{dup}(s, u)|^2 + |H_{dup}(s, N_u + u)|^2} \quad (14)$$

In equations (12) through (14), $X=R_{dup}(s,u)H_{dup}(s,u)^*$ and $Y=R_{dup}(s,N_u+u)H_{dup}(s,N_u+u)^*$. The terms s, k, u and $N_u$ are as indicated above.

Figure 9:
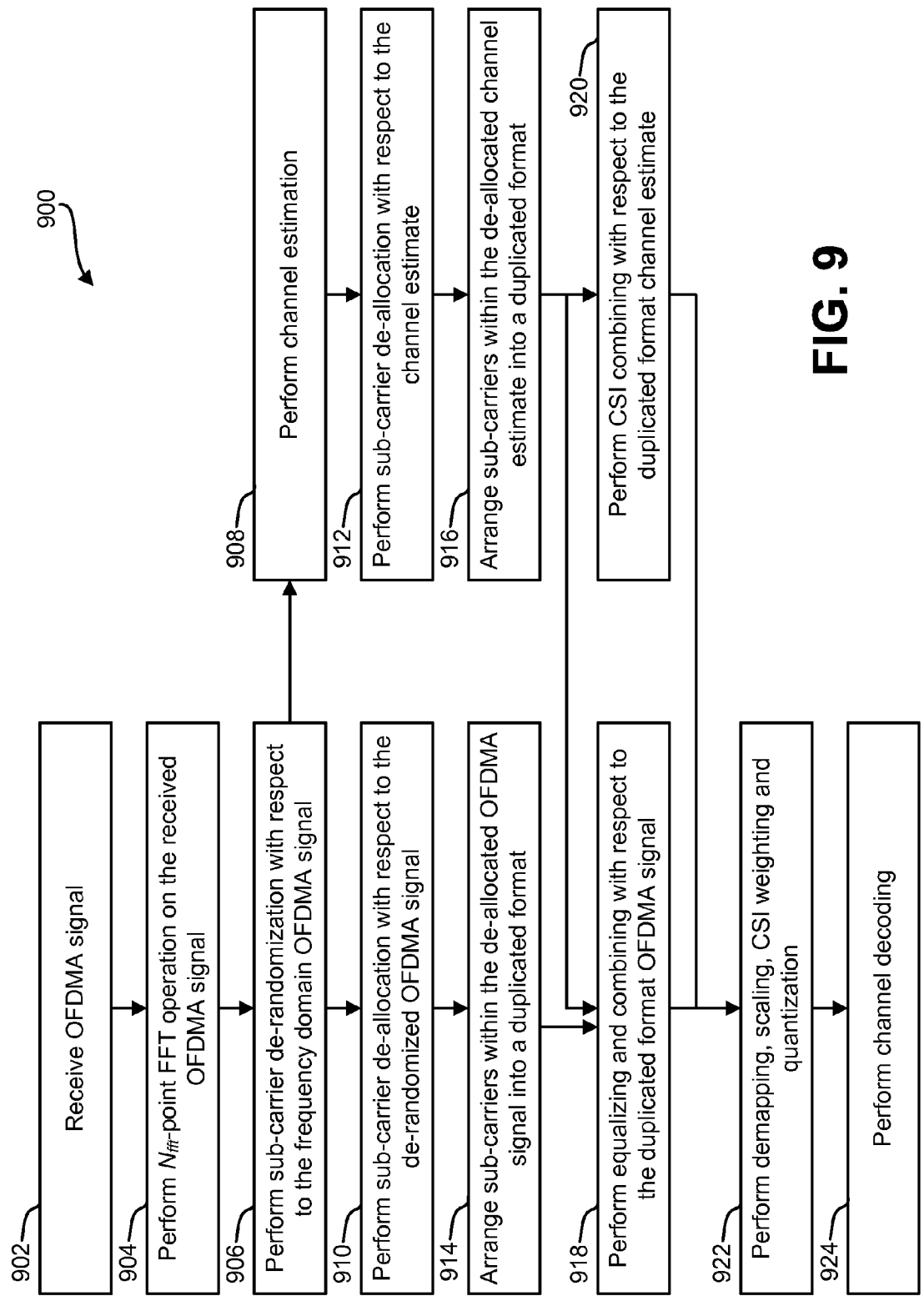
FIG. 9 illustrates an example of a method for decoding an OFDMA signal that includes a duplicated signal.

FIG. 9 illustrates an example of a method 900 for decoding an OFDMA signal that includes a duplicated signal. The method 900 may be performed by an OFDMA receiver 604.

When an OFDMA signal 620a is received 902, an $N_{fft}$-point FFT operation may be performed 904 on the received OFDMA signal 620a, resulting in a frequency domain OFDMA signal 620b. Sub-carrier de-randomization may be performed 906 with respect to the frequency domain OFDMA signal 620b, resulting in a de-randomized OFDMA signal 620c. The de-randomized OFDMA signal 620c may be used to perform 908 channel estimation, resulting in a channel estimate 630a.

Sub-carrier de-allocation may be performed 910 with respect to the de-randomized OFDMA signal 620c, resulting in a de-allocated OFDMA signal 620d. Sub-carrier de-allocation may also be performed 912 with respect to the channel estimate 630a, resulting in a de-allocated channel estimate 630b.

A look-ahead sub-carrier arranging scheme may be utilized to arrange 914 the sub-carriers within the de-allocated OFDMA signal 620d into a duplicated format 620e, and also to arrange 916 the sub-carriers within the de-allocated channel estimate 630b into a duplicated format 630c. Equalizing and combining may then be performed 918 with respect to the duplicated format OFDMA signal 620e. CSI combining may be performed 920 with respect to the duplicated format channel estimate 630d.

Demapping, scaling, CSI weighting and quantization may then be performed 922, resulting in a demapped signal 620g. Channel decoding may then be performed 924 with respect to the demapped signal 620g, resulting in the payload 642.

Figure 10:
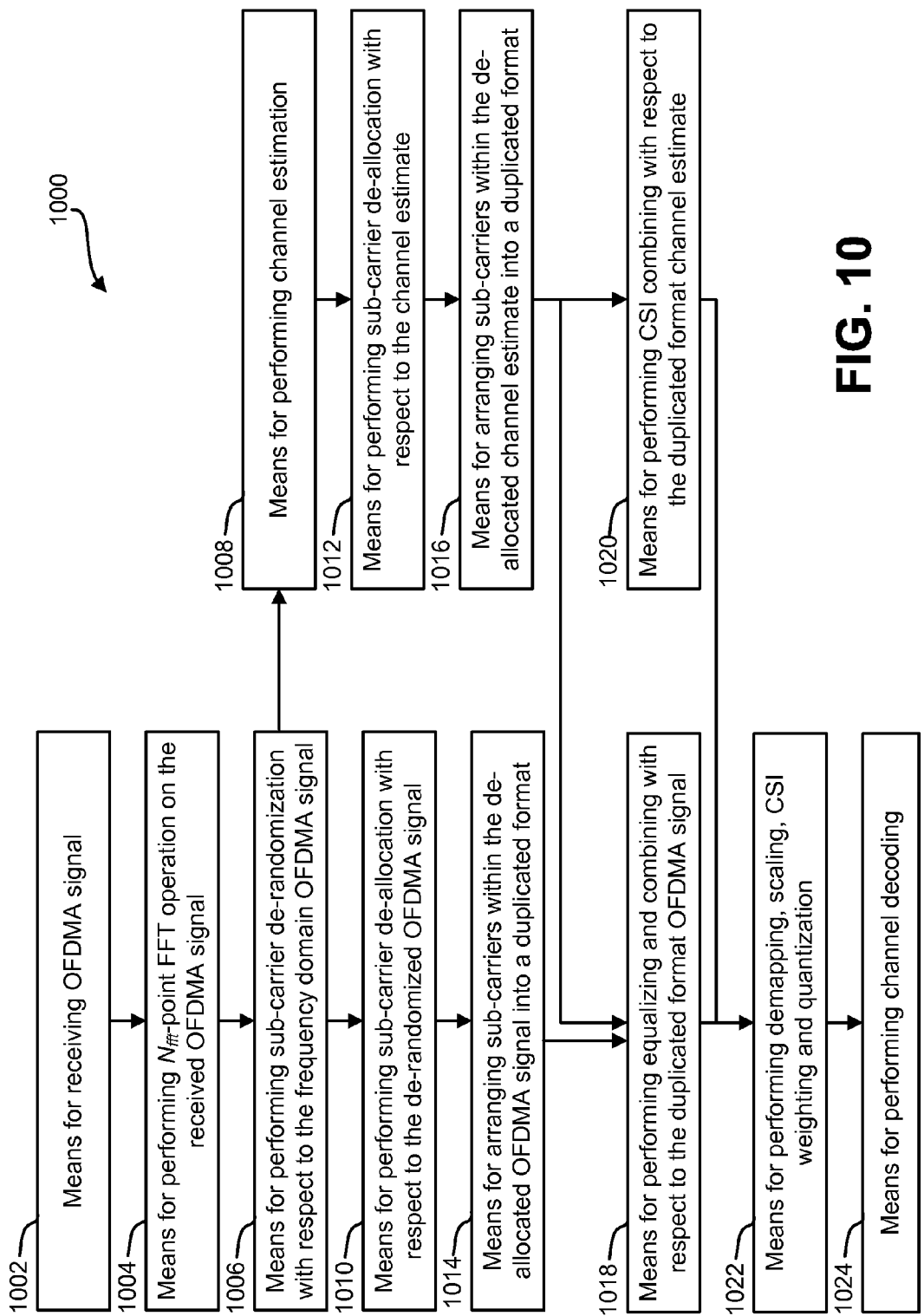
FIG. 10 illustrates means-plus-function blocks corresponding to the method shown in FIG. 9.

The method of FIG. 9 described above may be performed by various hardware and/or software component(s) and/or module(s) corresponding to the means-plus-function blocks illustrated in FIG. 10. In other words, blocks 902 through 924 illustrated in FIG. 9 correspond to means-plus-function blocks 1002 through 1024 illustrated in FIG. 10.

Figure 11:
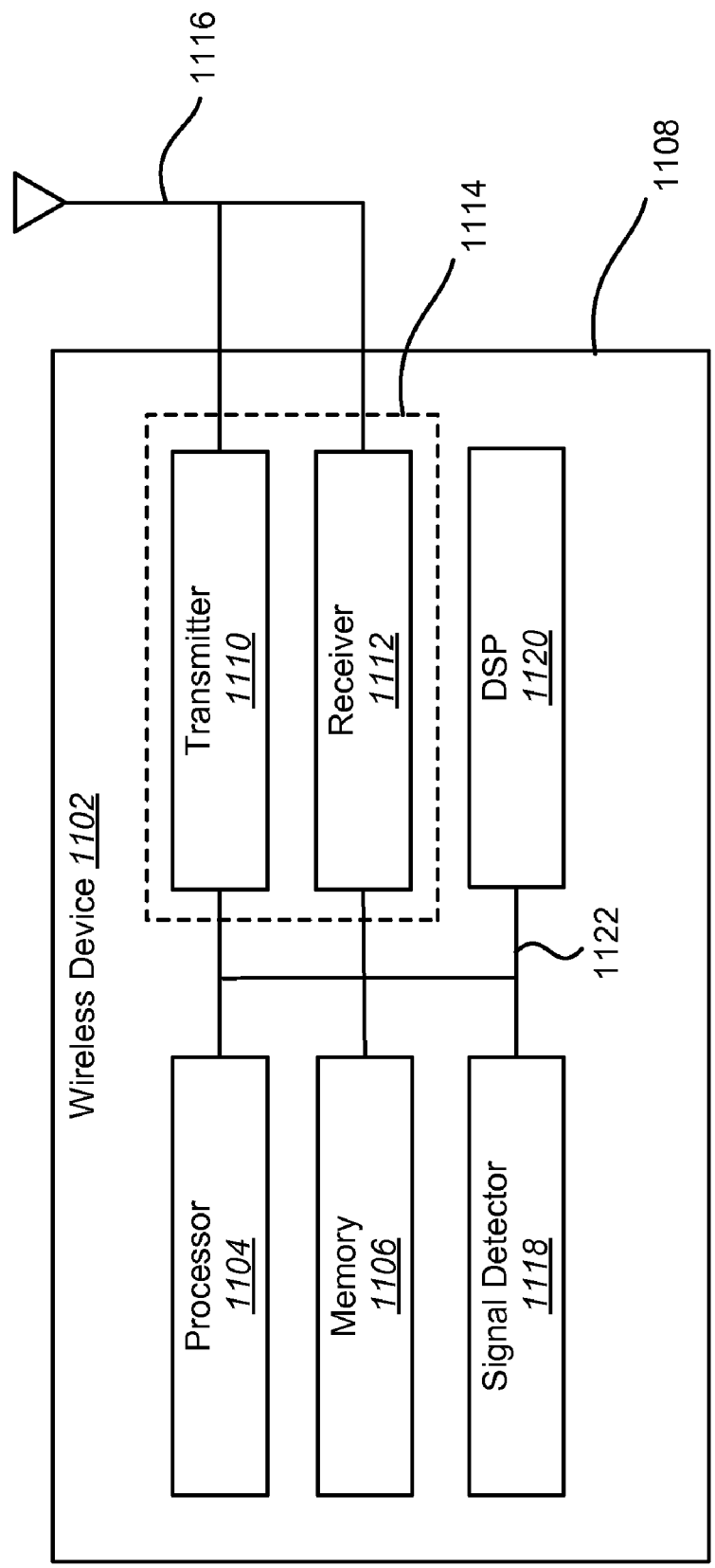
FIG. 11 illustrates various components that may be utilized in a wireless device.

FIG. 11 illustrates various components that may be utilized in a wireless device 1102. The wireless device 1102 is an example of a device that may be configured to implement the various methods described herein. The wireless device 1102 may be a base station 104 or a user terminal 106.

The wireless device 1102 may include a processor 1104 which controls operation of the wireless device 1102. The processor 1104 may also be referred to as a central processing unit (CPU). Memory 1106, which may include both read-only memory (ROM) and random access memory (RAM), provides instructions and data to the processor 1104. A portion of the memory 1106 may also include non-volatile random access memory (NVRAM). The processor 1104 typically performs logical and arithmetic operations based on program instructions stored within the memory 1106. The instructions in the memory 1106 may be executable to implement the methods described herein.

The wireless device 1102 may also include a housing 1108 that may include a transmitter 1111 and a receiver 1112 to allow transmission and reception of data between the wireless device 1102 and a remote location. The transmitter 1111 and receiver 1112 may be combined into a transceiver 1114. An antenna 1116 may be attached to the housing 1108 and electrically coupled to the transceiver 1114. The wireless device 1102 may also include (not shown) multiple transmitters, multiple receivers, multiple transceivers and/or multiple antenna.

The wireless device 1102 may also include a signal detector 1118 that may be used to detect and quantify the level of signals received by the transceiver 1114. The signal detector 1118 may detect such signals as total energy, pilot energy per pseudonoise (PN) chips, power spectral density, and other signals. The wireless device 1102 may also include a digital signal processor (DSP) 1120 for use in processing signals.

The various components of the wireless device 1102 may be coupled together by a bus system 1122 which may include a power bus, a control signal bus, and a status signal bus in addition to a data bus. However, for the sake of clarity, the various busses are illustrated in FIG. 11 as the bus system 1122.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 9-10, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for processing a received orthogonal frequency division multiple access (OFDMA) signal that comprises a duplicated signal, comprising:
    arranging sub-carriers within the OFDMA signal into a duplicated format;
    equalizing and combining the OFDMA signal after the sub-carriers have been arranged into the duplicated format, wherein the equalizing and combining is performed in accordance with a maximum ratio combining (MRC) scheme; and
    demapping the OFDMA signal, wherein the demapping is performed after the equalizing and combining is performed.

2. The method of claim 1, wherein arranging the sub-carriers within the OFDMA signal into the duplicated format comprises performing look-ahead processing.

3. The method of claim 2, wherein the look-ahead processing comprises reverse-tracing a transmission process that is implemented by a transmitter of the OFDMA signal.

4. The method of claim 2, wherein the look-ahead processing comprises performing de-interleaving prior to the equalizing and combining of the OFDMA signal.

5. The method of claim 1, wherein the equalizing and combining is performed as $$R_e(u) = \frac{R_{dup}(s, u)H_{dup}(s, u)^* + R_{dup}(s, N_u + u)H_{dup}(s, N_u + u)^*}{|H_{dup}(s, u)|^2 + |H_{dup}(s, N_u + u)|^2},$$

wherein s is an allocated slot index, wherein s=1, 2, ..., $N_s$, wherein u=1, 2, ..., $N_u$, wherein $$N_u = \frac{N_{sc}}{2},$$

wherein $N_{sc}$ is the number of sub-carriers for a slot, wherein $R_{dup}()$ is the OFDMA signal arranged into the duplicated format, and wherein $H_{dup}()$ is a channel status information signal arranged into the duplicated format.

6. The method of claim 1, further comprising:
    arranging the sub-carriers within a channel status information (CSI) signal into the duplicated format; and
    performing CSI combining with respect to the CSI signal after the sub-carriers have been arranged into the duplicated format.

7. The method of claim 6, wherein the CSI combining is performed as $$H_e(u) = \frac{|H_{dup}(s, u)|^2 + |H_{dup}(s, N_u + u)|^2}{2},$$

wherein s is an allocated slot index, wherein s=1, 2, ..., $N_s$, wherein u=1, 2, ..., $N_u$, wherein $$N_u = \frac{N_{sc}}{2},$$

wherein $N_{sc}$ is the number of sub-carriers for a slot, and wherein $H_{dup}(\ )$ is the CSI signal arranged into the duplicated format.

8. The method of claim 1, wherein the OFDMA signal comprises duplication pairs that are distributed across different sub-carriers.

9. The method of claim 8, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=c_1+ja_2$, and wherein the equalization and combining for the first duplication pair $a_1$ and $a_2$ is performed as $$R_e(u) = \frac{\text{Re}\{X\} + \text{Im}\{Y\}}{|H_{dup}(s,u)|^2 + |H_{dup}(s,N_u+u)|^2},$$

wherein $X=R_{dup}(s,u)H_{dup}(s,u)^*$ and $Y=R_{dup}(s,N_u+u)H_{dup}(s,N_u+u)^*$.

10. The method of claim 8, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=b_2+jc_2$, and wherein the equalization and combining for the second duplication pair $b_1$ and $b_2$ is performed as $$R_e(u) = \frac{\text{Im}\{X\} + \text{Re}\{Y\}}{|H_{dup}(s,u)|^2 + |H_{dup}(s,N_u+u)|^2},$$

wherein $X=R_{dup}(s,u)H_{dup}(s,u)^*$ and $Y=R_{dup}(s,N_u+u)H_{dup}(s,N_u+U)^*$.

11. The method of claim 8, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=c_1+ja_2$ and $R_{dup}(s,N_u+u)=b_2+jc_2$, and wherein the equalization and combining for the third duplication pair $c_1$ and $c_2$ is performed as $$R_e(u) = \frac{\text{Re}\{X\} + \text{Im}\{Y\}}{|H_{dup}(s,u)|^2 + |H_{dup}(s,N_u+u)|^2},$$

wherein $X=R_{dup}(s,u)H_{dup}(s,u)^*$ and $Y=R_{dup}(s,N_u+u)H_{dup}(s,N_u+u)^*$.

12. The method of claim 1, wherein the duplicated signal comprises a downlink frame prefix (DLFP) message.

13. A wireless device for processing a received orthogonal frequency division multiple access (OFDMA) signal that comprises a duplicated signal, comprising:
a first look-ahead sub-carrier arranger that is configured to arrange sub-carriers within the OFDMA signal into a duplicated format;
an equalizer and combiner that is configured to equalize and combine the OFDMA signal after the sub-carriers have been arranged into the duplicated format, wherein the equalizing and combining is performed in accordance with a maximum ratio combining (MRC) scheme; and
a demapper that is configured to demap the OFDMA signal, wherein the demapping is performed after the equalizing and combining is performed.

14. The wireless device of claim 13, wherein arranging the sub-carriers within the OFDMA signal into the duplicated format comprises performing look-ahead processing.

15. The wireless device of claim 14, wherein the look-ahead processing comprises reverse-tracing a transmission process that is implemented by a transmitter of the OFDMA signal.

16. The wireless device of claim 14, wherein the look-ahead processing comprises performing de-interleaving prior to the equalizing and combining of the OFDMA signal.

17. The wireless device of claim 13, wherein the equalizing and combining is performed as $$R_e(u) = \frac{R_{dup}(s,u)H_{dup}(s,u)^* + R_{dup}(s,N_u+u)H_{dup}(s,N_u+u)^*}{|H_{dup}(s,u)|^2 + |H_{dup}(s,N_u+u)|^2},$$

wherein s is an allocated slot index, wherein $s=1, 2, \ldots, N_s$, wherein $u=1, 2, \ldots, N_u$, wherein $$N_u = \frac{N_{sc}}{2},$$

wherein $N_{sc}$ is the number of sub-carriers for a slot, wherein $R_{dup}(\ )$ is the OFDMA signal arranged into the duplicated format, and wherein $H_{dup}(\ )$ is a channel status information signal arranged into the duplicated format.

18. The wireless device of claim 13, further comprising:
a second look-ahead sub-carrier arranger that is configured to arrange the sub-carriers within a channel status information (CSI) signal into the duplicated format; and
a CSI combiner that is configured to perform CSI combining with respect to the CSI signal after the sub-carriers have been arranged into the duplicated format.

19. The wireless device of claim 18, wherein the CSI combining is performed as $$H_e(u) = \frac{|H_{dup}(s,u)|^2 + |H_{dup}(s,N_u+u)|^2}{2},$$

wherein s is an allocated slot index, wherein $s=1, 2, \ldots, N_s$, wherein $u=1, 2, \ldots, N_u$, wherein $$N_u = \frac{N_{sc}}{2},$$

wherein $N_{sc}$ is the number of sub-carriers for a slot, and wherein $H_{dup}(\ )$ is the CSI signal arranged into the duplicated format.

20. The wireless device of claim 13, wherein the OFDMA signal comprises duplication pairs that are distributed across different sub-carriers.

21. The wireless device of claim 20, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=c_1+ja_2$, and wherein the equalization and combining for the first duplication pair $a_1$ and $a_2$ is performed as $$R_e(u) = \frac{\text{Re}\{X\} + \text{Im}\{Y\}}{|H_{dup}(s,u)|^2 + |H_{dup}(s,N_u+u)|^2},$$

wherein $X=R_{dup}(s,u)H_{dup}(s,u)^*$ and $Y=R_{dup}(s,N_u+u)H_{dup}(s,N_u+u)^*$.

22. The wireless device of claim 20, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=b_2+jc_2$, and wherein the equalization and combining for the second duplication pair $b_1$ and $b_2$ is performed as $$R_e(u) = \frac{\text{Im}\{X\} + \text{Re}\{Y\}}{|H_{dup}(s, u)|^2 + |H_{dup}(s, N_u + u)|^2},$$

wherein $X=R_{dup}(s,u)H_{dup}(s,u)^*$ and $Y=R_{dup}(s,N_u+u)H_{dup}(s,N_u+u)^*$.

23. The wireless device of claim 20, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=c_1+ja_2$ and $R_{dup}(s,N_u+u)=b_2+jc_2$, and wherein the equalization and combining for the third duplication pair $c_1$ and $c_2$ is performed as $$R_e(u) = \frac{\text{Re}\{X\} + \text{Im}\{Y\}}{|H_{dup}(s, u)|^2 + |H_{dup}(s, N_u + u)|^2},$$

wherein $X=R_{dup}(s,u)H_{dup}(s,u)^*$ and $Y=R_{dup}(s,N_u+u)H_{dup}(s,N_u+u)^*$.

24. The wireless device of claim 13, wherein the duplicated signal comprises a downlink frame prefix (DLFP) message.

25. An apparatus for processing a received orthogonal frequency division multiple access (OFDMA) signal that comprises a duplicated signal, comprising:
 means for arranging sub-carriers within the OFDMA signal into a duplicated format;
 means for equalizing and combining the OFDMA signal after the sub-carriers have been arranged into the duplicated format, wherein the equalizing and combining is performed in accordance with a maximum ratio combining (MRC) scheme; and
 means for demapping the OFDMA signal, wherein the demapping is performed after the equalizing and combining is performed.

26. The apparatus of claim 25, wherein arranging the sub-carriers within the OFDMA signal into the duplicated format comprises performing look-ahead processing.

27. The apparatus of claim 26, wherein the look-ahead processing comprises reverse-tracing a transmission process that is implemented by a transmitter of the OFDMA signal.

28. The apparatus of claim 26, wherein the look-ahead processing comprises performing de-interleaving prior to the equalizing and combining of the OFDMA signal.

29. The apparatus of claim 25, wherein the equalizing and combining is performed as $$\text{as } R_e(u) = \frac{R_{dup}(s, u)H_{dup}(s, u)^* + R_{dup}(s, N_u + u)H_{dup}(s, N_u + u)^*}{|H_{dup}(s, u)|^2 + |H_{dup}(s, N_u + u)|^2},$$

wherein s is an allocated slot index, wherein $s=1, 2, \ldots, N_s$, wherein $u=1, 2, \ldots, N_u$, wherein $$N_u = \frac{N_{sc}}{2},$$

wherein $N_{sc}$ is the number of sub-carriers for a slot, wherein $R_{dup}(\ )$ is the OFDMA signal arranged into the duplicated format, and wherein $H_{dup}(\ )$ is a channel status information signal arranged into the duplicated format.

30. The apparatus of claim 25, further comprising:
 means for arranging the sub-carriers within a channel status information (CSI) signal into the duplicated format; and
 means for performing CSI combining with respect to the CSI signal after the sub-carriers have been arranged into the duplicated format.

31. The apparatus of claim 30, wherein the CSI combining is performed as $$H_e(u) = \frac{|H_{dup}(s, u)|^2 + |H_{dup}(s, N_u + u)|^2}{2},$$

wherein s is an allocated slot index, wherein $s=1, 2, \ldots, N_s$, wherein $u=1, 2, \ldots, N_u$, wherein $$N_u = \frac{N_{sc}}{2},$$

wherein $N_{sc}$ is the number of sub-carriers for a slot, and wherein $H_{dup}(\ )$ is the CSI signal arranged into the duplicated format.

32. The apparatus of claim 25, wherein the OFDMA signal comprises duplication pairs that are distributed across different sub-carriers.

33. The apparatus of claim 32, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=c_1+ja_2$, and wherein the equalization and combining for the first duplication pair $a_1$ and $a_2$ is performed as $$R_e(u) = \frac{\text{Re}\{X\} + \text{Im}\{Y\}}{|H_{dup}(s, u)|^2 + |H_{dup}(s, N_u + u)|^2},$$

wherein $X=R_{dup}(s,u)H_{dup}(s,u)^*$ and $Y=R_{dup}(s,N_u+u)H_{dup}(s,N_u+u)^*$.

34. The apparatus of claim 32, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=b_2+jc_2$, and wherein the equalization and combining for the second duplication pair $b_1$ and $b_2$ is performed as $$R_e(u) = \frac{\text{Im}\{X\} + \text{Re}\{Y\}}{|H_{dup}(s, u)|^2 + |H_{dup}(s, N_u + u)|^2},$$

wherein $X=R_{dup}(s,u)H_{dup}(s,u)^*$ and $Y=R_{dup}(s,N_u+u)H_{dup}(s,N_u+u)^*$.

35. The apparatus of claim 32, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=c_1+ja_2$ and $R_{dup}(s,N_u+u)=b_2+jc_2$, and wherein the equalization and combining for the third duplication pair $c_1$ and $c_2$ is performed as $$R_e(u) = \frac{\text{Re}\{X\} + \text{Im}\{Y\}}{|H_{dup}(s, u)|^2 + |H_{dup}(s, N_u + u)|^2},$$

wherein $X = R_{dup}(s,u)H_{dup}(s,u)^*$ and $Y = R_{dup}(s,N_u+u)H_{dup}(s,N_u+u)^*$.

36. The apparatus of claim 25, wherein the duplicated signal comprises a downlink frame prefix (DLFP) message.

37. A computer-program product for processing a received orthogonal frequency division multiple access (OFDMA) signal that comprises a duplicated signal, the computer-program product comprising a computer readable medium having instructions thereon, the instructions comprising:
  code for arranging sub-carriers within the OFDMA signal into a duplicated format;
  code for equalizing and combining the OFDMA signal after the sub-carriers have been arranged into the duplicated format, wherein the equalizing and combining is performed in accordance with a maximum ratio combining (MRC) scheme; and
  code for demapping the OFDMA signal, wherein the demapping is performed after the equalizing and combining is performed.

38. The computer-program product of claim 37, wherein arranging the sub-carriers within the OFDMA signal into the duplicated format comprises performing look-ahead processing.

39. The computer-program product of claim 38, wherein the look-ahead processing comprises reverse-tracing a transmission process that is implemented by a transmitter of the OFDMA signal.

40. The computer-program product of claim 38, wherein the look-ahead processing comprises performing de-interleaving prior to the equalizing and combining of the OFDMA signal.

41. The computer-program product of claim 37, wherein the equalizing and combining is performed as $$R_e(u) = \frac{R_{dup}(s, u)H_{dup}(s, u)^* + R_{dup}(s, N_u + u)H_{dup}(s, N_u + u)^*}{|H_{dup}(s, u)|^2 + |H_{dup}(s, N_u + u)|^2},$$

wherein s is an allocated slot index, wherein $s=1, 2, \ldots, N_s$, wherein $u=1, 2, \ldots, N_u$, wherein $$N_u = \frac{N_{sc}}{2},$$

wherein $N_{sc}$ is the number of sub-carriers for a slot, wherein $R_{dup}(\,)$ is the OFDMA signal arranged into the duplicated format, and wherein $H_{dup}(\,)$ is a channel status information signal arranged into the duplicated format.

42. The computer-program product of claim 37, further comprising:
  arranging the sub-carriers within a channel status information (CSI) signal into the duplicated format; and
  performing CSI combining with respect to the CSI signal after the sub-carriers have been arranged into the duplicated format.

43. The computer-program product of claim 42, wherein the CSI combining is performed as $$H_e(u) = \frac{|H_{dup}(s, u)|^2 + |H_{dup}(s, N_u + u)|^2}{2},$$

wherein s is an allocated slot index, wherein $s=1, 2, \ldots, N_s$, wherein $u=1, 2, \ldots, N_u$, wherein $$N_u = \frac{N_{sc}}{2},$$

wherein $N_{sc}$ is the number of sub-carriers for a slot, and wherein $H_{dup}(\,)$ is the CSI signal arranged into the duplicated format.

44. The computer-program product of claim 37, wherein the OFDMA signal comprises duplication pairs that are distributed across different sub-carriers.

45. The computer-program product of claim 44, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=c_1+ja_2$, and wherein the equalization and combining for the first duplication pair $a_1$ and $a_2$ is performed as $$R_e(u) = \frac{\text{Re}\{X\} + \text{Im}\{Y\}}{|H_{dup}(s, u)|^2 + |H_{dup}(s, N_u + u)|^2},$$

wherein $X = R_{dup}(s,u)H_{dup}(s,u)^*$ and $Y = R_{dup}(s,N_u+u)H_{dup}(s,N_u+u)^*$.

46. The computer-program product of claim 44, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=a_1+jb_1$ and $R_{dup}(s,N_u+u)=b_2+jc_2$, and wherein the equalization and combining for the second duplication pair $b_1$ and $b_2$ is performed as $$R_e(u) = \frac{\text{Im}\{X\} + \text{Re}\{Y\}}{|H_{dup}(s, u)|^2 + |H_{dup}(s, N_u + u)|^2},$$

wherein $X = R_{dup}(s,u)H_{dup}(s,u)^*$ and $Y = R_{dup}(s,N_u+u)H_{dup}(s,N_u+u)^*$.

47. The computer-program product of claim 44, wherein the duplication pairs comprise a first duplication pair $a_1$ and $a_2$, a second duplication pair $b_1$ and $b_2$, and a third duplication pair $c_1$ and $c_2$, wherein $R_{dup}(s,u)=c_1+ja_2$ and $R_{dup}(s,N_u+u)=b_2+jc_2$, and wherein the equalization and combining for the third duplication pair $c_1$ and $c_2$ is performed as $$R_e(u) = \frac{\text{Re}\{X\} + \text{Im}\{Y\}}{|H_{dup}(s, u)|^2 + |H_{dup}(s, N_u + u)|^2},$$

wherein $X = R_{dup}(s,u)H_{dup}(s,u)^*$ and $Y = R_{dup}(s,N_u+u)H_{dup}(s,N_u+u)^*$.

48. The computer-program product of claim 37, wherein the duplicated signal comprises a downlink frame prefix (DLFP) message.

* * * * *